US011915167B2

(12) United States Patent
Dickerson et al.

(10) Patent No.: US 11,915,167 B2
(45) Date of Patent: Feb. 27, 2024

(54) CLAIM ANALYSIS BASED ON CANDIDATE FUNCTIONS

(71) Applicant: State Farm Mutual Automobile Insurance Company, Bloomington, IL (US)

(72) Inventors: Jeremy David Dickerson, Dallas, GA (US); Matthew Marsh, Bloomington, IL (US); Garren King, Eureka, IL (US); Justin Devore, Atlanta, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 217 days.

(21) Appl. No.: 17/400,921

(22) Filed: Aug. 12, 2021

(65) Prior Publication Data
US 2022/0051164 A1    Feb. 17, 2022

Related U.S. Application Data

(60) Provisional application No. 63/064,820, filed on Aug. 12, 2020.

(51) Int. Cl.
*G06Q 10/0631* (2023.01)
*G06F 16/332* (2019.01)
*G06F 16/35* (2019.01)
*G06Q 40/08* (2012.01)

(52) U.S. Cl.
CPC .  *G06Q 10/063112* (2013.01); *G06F 16/3329* (2019.01); *G06F 16/35* (2019.01); *G06Q 40/08* (2013.01)

(58) Field of Classification Search
CPC ..................... G06Q 10/063112; G06Q 40/08; G06F 16/35; G06F 16/3329
USPC ....................................................... 705/7.14
See application file for complete search history.

(56) References Cited

U.S. PATENT DOCUMENTS

| | | | |
|---|---|---|---|
| 7,346,490 B2 | 3/2008 | Fass et al. | |
| 7,657,424 B2 | 2/2010 | Bennett | |
| 7,996,208 B2 | 8/2011 | Elbaz et al. | |
| 8,190,538 B2 | 5/2012 | Zhang et al. | |

(Continued)

FOREIGN PATENT DOCUMENTS

WO    WO2012081385 A1    6/2012

OTHER PUBLICATIONS

Li, et al., Routing of XML and XPath queries in data dissemination networks, The 28th International Conference on Distributed Computing Systems, IEEE, pp. 627-638 (2008) (Year: 2008).*

*Primary Examiner* — Charles Guiliano
(74) *Attorney, Agent, or Firm* — Lee & Hayes, P.C.

(57) ABSTRACT

Candidate function data can include data for multiple candidate functions that may indicate whether insurance claims are likely to involve certain issues, such as comparative negligence issues. A real-time claim identifier can use the candidate function data to determine, in near real-time, if claim data for a new insurance claim submitted to an insurance company satisfies at least one of the candidate functions. If the claim data satisfies at least one of the candidate functions, the insurance claim can be assigned to a corresponding destination in the insurance company, such as a department that processes comparative negligence claims, for further processing.

17 Claims, 4 Drawing Sheets

(56) References Cited

U.S. PATENT DOCUMENTS

| | | |
|---|---|---|
| 8,447,632 B2 | 5/2013 | Hogan et al. |
| 8,478,583 B2 | 7/2013 | Hogan et al. |
| 9,037,580 B2 | 5/2015 | Brown et al. |
| 10,691,685 B2 | 6/2020 | Verma et al. |
| 2003/0177118 A1* | 9/2003 | Moon .................. G06F 16/353 707/999.005 |
| 2004/0078386 A1* | 4/2004 | Moon .................... G06F 16/30 707/999.102 |
| 2004/0260681 A1 | 12/2004 | Dvorak |
| 2007/0282824 A1* | 12/2007 | Ellingsworth ........ G06F 16/313 707/999.005 |
| 2008/0281811 A1 | 11/2008 | Korst et al. |
| 2009/0216803 A1* | 8/2009 | Goldfarb ................ G06Q 40/08 |
| 2010/0211413 A1* | 8/2010 | Tholl ..................... G06Q 10/00 705/4 |
| 2016/0071218 A1* | 3/2016 | Blakeman ...... G06Q 10/063116 705/4 |

\* cited by examiner

| String Sets 202 | Text Strings 204 |
|---|---|
| V1_traveling_straight | I was driving; I was going; I/V traveling; Insured was driving; My vehicle while driving; Ni driving; Ni got; Ni took; Ni traveling; Ni was driving; Ni was going... |
| V1_attempting | I tried to; Ni attempted to: Ni proceeded to; Ni proceeded; Ni tried to; Ni was attempting to; Ni went to; V1 attempt to; V1 attempted to; V1 attempted... |
| V2_attempting | Clmt continued to; Clmt kept; Clmt went; V2 attempt to; V2 attempted to; V2 attempted; V2 attempting to; V2 continue to; V2 continued to; V2 failed to. |
| Same_Time | Both attempted; Both attempting; Both backed; Both backing up; Both collide; Both collided; Both trying; V1 and V2; Insured and V2; Insured and Claimant... |
| V2_swerve_or_same_lane_and | V2 swerve; V2 swerved; V2 veered... |

CLAIM ANALYSIS BASED ON CANDIDATE FUNCTIONS

RELATED APPLICATIONS

This U.S. patent application claims priority to provisional U.S. Patent Application No. 63/064,820, entitled "CLAIM ANALYSIS BASED ON CANDIDATE FUNCTIONS," filed on Aug. 12, 2020, the entirety of which is incorporated herein by reference.

TECHNICAL FIELD

The present disclosure relates to identifying insurance claims likely to be associated with comparative negligence issues, and more particularly to using candidate functions associated with historically-defined sets of text strings and logical operators to determine if insurance claim data includes text that is indicative of comparative negligence issues.

BACKGROUND

Insurance claims related to losses can be filed with an insurance company. For example, an insurance claim can be related to a loss incurred during an automobile accident or other incident. In some situations, a loss may be the result of the actions of a single party. However, in other situations, a loss may be the result of the actions of multiple parties, such that multiple parties are at least partially at fault.

When an insurance company processes an insurance claim involving multiple parties, a claim handler or other representative of the insurance company may determine if comparative negligence principles apply to the claim. For example, the claim handler may determine that a first party was 70% at fault for a loss, and that a second party was 30% at fault for the loss, such that both parties share liability for the loss in a comparative negligence situation. In some examples, the insurance company may provide recovery (e.g., payments) associated with such a comparative negligence claim based on fault percentages associated with different parties.

The insurance company may have different groups of workers that process insurance claims. Different groups may be authorized to work on different types of insurance claims, and/or may have experience with handling different types of insurance claims. For example, at least one of the groups may include claim handlers or other workers who are authorized to process comparative negligence claims, specialize in comparative negligence claims, and/or have at least a threshold amount of experience in processing comparative negligence claims. This group may have experience with complex issues such as determining whether comparative negligence principles apply to an insurance claim, and/or assigning percentages of fault to different parties associated with the insurance claim. Other groups may include workers who are authorized to work on relatively simple insurance claims or other types of insurance claims, but may have less experience with processing comparative negligence claims and/or may not be authorized to process comparative negligence claims.

When an insurance claim is submitted to an insurance company, the insurance claim can be assigned to a particular group within the insurance company, so that one or more workers in the group can process the insurance claim as discussed above. For example, when information about a loss is received by the insurance company, the insurance company can assign a corresponding insurance claim to one of the groups of workers.

However, it can be difficult to determine which group of workers within the insurance company should be assigned to process an insurance claim, especially when information is first received about the insurance claim. For example, when an insurance claim related to a loss is filed with the insurance company, information provided by one or more parties can be collected and used to generate a loss report. The loss report can include a loss description that describes an accident and/or other circumstances associated with the loss. However, the complexity level of the insurance claim may initially be unclear. Additionally, even if the loss description references multiple parties, the claim may or may not involve comparative negligence issues. Accordingly, it may be initially unclear whether the insurance claim does or does not involve comparative negligence issues, and thus it may be initially unclear whether the insurance claim should be assigned to a group of workers that specializes in comparative negligence issues.

In some cases, an insurance claim can be transferred or reassigned between groups before the insurance claim is ultimately processed. For example, an insurance claim may initially be assigned to a first group that is not authorized to process comparative negligence claims, or has less experience with comparative negligence claims than a second group. When a claim handler of the first group begins to process the insurance claim, the claim handler may recognize that the insurance claim involves comparative negligence issues. The claim handler of the first group may accordingly cause the insurance claim to be reassigned or transferred to the second group that specializes in comparative negligence claims, has more experience with comparative negligence claims, and/or is authorized to process comparative negligence claims.

Such transfers or reassignments of insurance claims between groups may introduce delays in claim processing. For example, delays can occur if an insurance claim is initially assigned to a group that does not ultimately process the insurance claim, as discussed above, such that the insurance claim is transferred or reassigned between groups before the insurance claim is ultimately processed. In some cases, claim processing may not begin, or may not be completed, until an insurance claim is reassigned from an initially-assigned group to a different group.

Transfers or reassignments of insurance claims between groups can also lead to an inefficient use of resources, and/or other inefficiencies, associated with claim processing. For example, computing resources, worker time, and/or other resources associated with a group that is initially assigned to process an insurance claim may be wasted if the insurance claim is ultimately transferred to a different group that then actually processes the insurance claim. Initially assigning insurance claims to groups that later transfer the insurance claims to other groups can also lead to increased network traffic and increased bandwidth usage as insurance claims are transferred between computing devices associated with the groups.

As such, an insurance claim can be processed more quickly and/or more efficiently when the insurance claim is initially assigned to the group that ultimately processes the claim. Accordingly, it can be beneficial to identify insurance claims that are more likely than other insurance claims to involve comparative negligence issues, so that the identified insurance claims can be initially assigned directly to a group that is qualified to handle comparative negligence issues.

However, while some conventional systems have been developed to identify insurance claims that may be likely to involve comparative negligence issues, such conventional systems often introduce delays and/or inefficiencies of their own.

For example, some conventional systems use language processing to execute queries on text associated with insurance claims. The language processing queries can be designed to find words and/or phrases in the text that may indicate a likelihood that the insurance claims involve comparative negligence issues. However, such language processing queries may take a relatively long time to execute, and/or take a relatively large amount of processing power, memory, and/or other computing resources. Accordingly, such conventional systems may not be configured to evaluate claim data for insurance claims in near real-time when the claim data is first received by the insurance company. For instance, conventional systems may execute on a daily basis, or other periodic basis, to run sets of language processing queries on claim data for a batch of insurance claims that were submitted at least one day earlier.

This type of periodic batch processing of insurance claims based on language processing queries can introduce delays in assigning newly submitted insurance claims to groups. For example, even if a conventional batch processing system finds text in claim data that satisfies a language processing query, and thus indicates that an insurance claim may be likely to involve comparative negligence issues, it may take a day or more for the claim data to be processed and for the identified insurance claim to be assigned to a comparative negligence group. Additionally, some conventional systems may flag insurance claims as being likely, or not being likely, to involve comparative negligence issues, but rely on a manual review of the flagged insurance claims to assign the insurance claims to corresponding groups. Such manual review and assignment of insurance claims to groups can also take time, leading to further delays in processing the insurance claims overall.

The example systems and methods described herein may be directed toward mitigating or overcoming one or more of the deficiencies described above.

SUMMARY

The systems and methods described herein can evaluate claim data, associated with insurance claims, to identify insurance claims that may be likely to involve comparative negligence issues in near real-time, for instance when the claim data is first submitted to an insurance company. For example, a real-time claim identifier can use one or more candidate functions to determine whether claim data for a new insurance claim includes text that satisfies at least one of the candidate functions. The candidate functions can be associated with at least one logical operator and predefined sets of text strings. The predefined sets of text strings can include text strings that have previously been determined to satisfy subqueries of a language processing query that was designed to identify likely comparative negligence issues within claim data. When claim data associated with a new insurance claim includes text that satisfies at least one of the candidate functions, the new insurance claim can be directly assigned to a group of workers that is associated with comparative negligence issues, instead of another group that may have less experience with comparative negligence issues. This process of identifying likely comparative negligence claims and assigning the likely comparative negligence claims to comparative negligence groups based on candidate functions can occur in a shorter period of time, and/or with the use of fewer computing resources, than conventional systems that use more time-intensive and processor-intensive language processing queries on claim data for batches of insurance claims.

According to a first aspect, a method can include obtaining, by a claim identification system, claim data associated with an insurance claim, and identifying, by the claim identification system, candidate function data associated with one or more candidate functions. The one or more candidate functions can be associated with a particular destination for the insurance claim. The candidate function data for a particular candidate function can include a plurality of string sets associated with the particular candidate function, and at least one logical operator that relates two or more of the plurality of string sets. The method can also include determining, by the claim identification system, that the claim data satisfies at least one of the one or more candidate functions, and assigning, by the claim identification system, the insurance claim to the particular destination, in response to the claim data satisfying the at least one of the one or more candidate functions.

According to a second aspect, a computing system can include one or more processors and memory storing computer-executable instructions that, when executed by the one or more processors, cause the computing system to perform operations. The operations can include obtaining claim data associated with an insurance claim, and identifying candidate function data associated with one or more candidate functions configured to determine whether the insurance claim is likely to involve comparative negligence issues. The one or more candidate functions can be associated with a comparative negligence group of workers within an insurance company. The candidate function data for a particular candidate function can include a plurality of string sets associated with the particular candidate function, and at least one logical operator that relates two or more of the plurality of string sets. The operations can also include determining that the claim data satisfies at least one of the one or more candidate functions, and assigning the insurance claim to the comparative negligence group, in response to the claim data satisfying the at least one of the one or more candidate functions.

According to a third aspect, one or more non-transitory computer-readable media can store computer-executable instructions that, when executed by one or more processors, cause the one or more processors to perform operations. The operations can include obtaining claim data associated with an insurance claim, and identifying candidate function data associated with one or more candidate functions. The one or more candidate functions can be associated with a particular destination for the insurance claim. The candidate function data for a particular candidate function can include a plurality of string sets associated with the particular candidate function, and at least one logical operator that relates two or more of the plurality of string sets. The operations can also include determining that the claim data satisfies at least one of the one or more candidate functions, and assigning the insurance claim to the particular destination, in response to the claim data satisfying the at least one of the one or more candidate functions.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
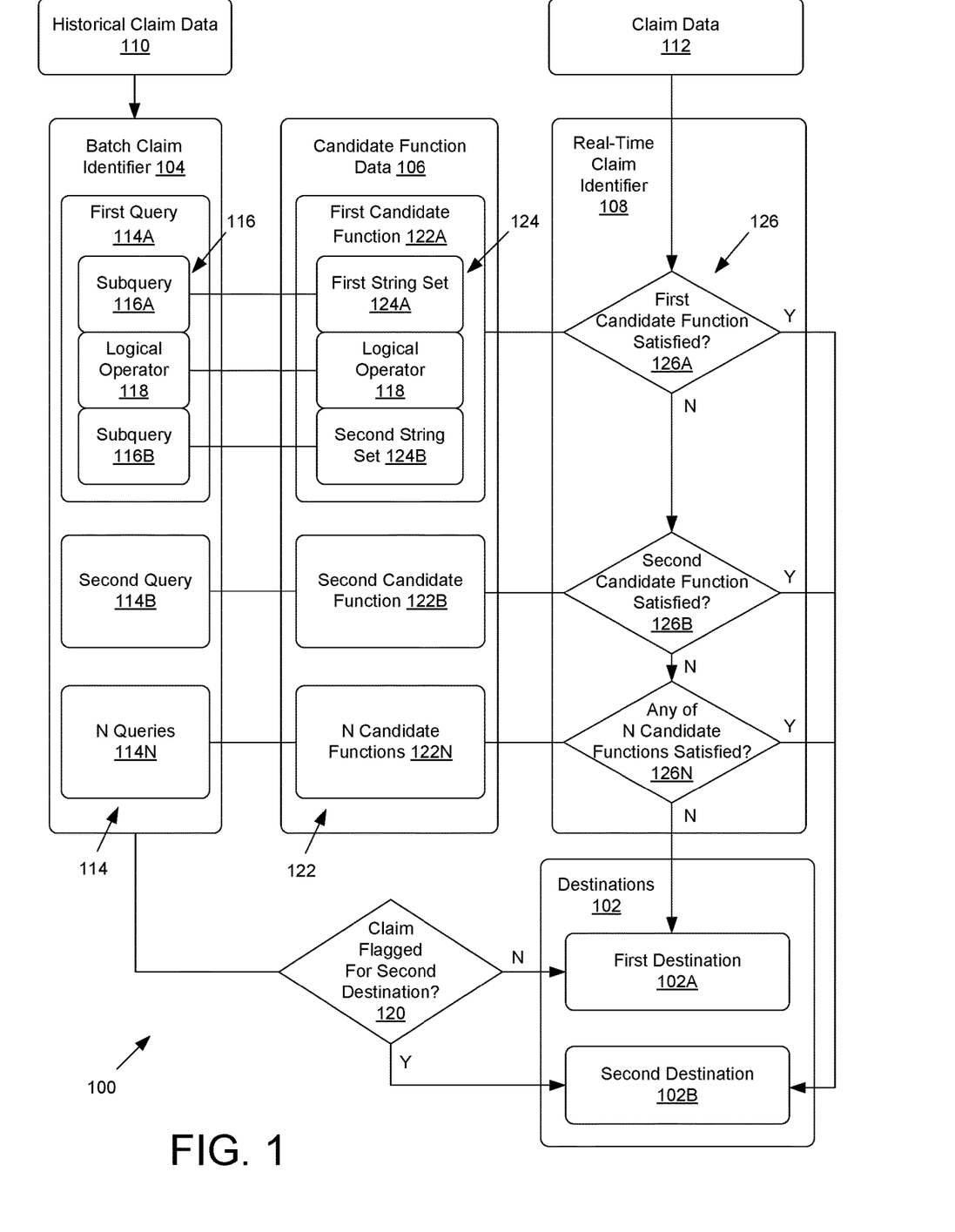
FIG. 1 shows an example of a claim identification system.

FIG. 1 shows an example of a claim identification system 100. The claim identification system 100 can analyze claims, such as insurance claims, to identify claims to assign to a particular destination within an insurance company.

Claims may be assigned to any of multiple destinations 102 within the insurance company. For example, FIG. 1 shows destinations 102 to which claims can be assigned, including a first destination 102A and a second destination 102B. Destinations 102 can be groups, segments, tiers, divisions, departments, teams, or other collections of one or more individuals who can at least partially process claims. For example, individual destinations 102 can include one or more claim handlers, claims adjustors, specialists, and/or other types of workers who perform tasks to process claims.

As a non-limiting example, an individual associated with a destination can process an automobile insurance claim by performing one or more tasks associated with the claim. The tasks may include determining whether parties have insurance coverage, determining how much insurance coverage the parties have, determining which one or more parties are at fault, determining if multiple parties are at fault in a comparative negligence situation, determining respective fault percentages of multiple parties in a comparative negligence situation, determining amounts to be paid to one or more parties, negotiating with insurers of other insured parties during subrogation situations, and/or other actions to at least partially process and/or resolve the automobile insurance claim.

Some destinations 102 can be associated with certain types of claims, and/or certain types of issues that may be involved in processing the claims. As an example, the first destination 102A shown in FIG. 1 may be a default destination equipped to process relatively simple claims, which may be the majority of claims in some cases. However, the second destination 102B can be a destination that specializes in processing more complex claims, such as claims that involve comparative negligence issues. For instance, the second destination 102B can be a department associated with a group of one or more claim handlers or other workers who specialize in comparative negligence issues, and/or are qualified to process claims that involve comparative negligence issues. Accordingly, the first destination 102A may be less equipped to process claims that involve comparative negligence issues than the second destination 102B. Accordingly, although claims may be initially set to be routed to the first destination 102A by default, the claim identification system 100 can be configured to identify claims that may be likely to involve comparative negligence issues and that should be re-routed or otherwise assigned to the second destination 102B rather than the first destination 102A.

In other examples, the first destination 102A and the second destination 102B can be associated with other different types of claims, different complexity levels of claims, and/or other different attributes of claims. For instance, for automobile and/or other property damage claims, the insurance company may have an "express" group that is set up to handle relatively simple claims, and a "property" group that is set up to handle more complex claims. In this example, the first destination 102A can be associated with the express group, while the second destination 102B can be associated with the property group. Accordingly, the claim identification system 100 can be configured to identify more complex claims that should be assigned to the property group instead of to the express group. In some examples, the property group may be qualified to process claims that involve comparative negligence issues, while the express group may not be qualified, or may be less qualified, to process claims that involve comparative negligence issues. As such, the claim identification system 100 can be configured to identify claims that may be likely to involve comparative negligence issues and that should be assigned to the property group instead of to the express group.

As shown in FIG. 1, the claim identification system 100 can include a batch claim identifier 104, candidate function data 106, and a real-time claim identifier 108. The batch claim identifier 104 can be configured to process data associated with a set of claims to identify any claims in the set that should be assigned to the second destination 102B instead of the first destination 102A. The batch claim identifier 104 may be configured to execute on batches of claim data on a delayed basis, rather than processing claim data substantially in real-time when the claim data is first provided to the insurance company. However, the candidate function data 106 can be generated over time based on analyses of historical claim data 110 by the batch claim identifier 104, as discussed below. Thereafter, the real-time claim identifier 108 can use the candidate function data 106 to evaluate claim data 112 associated with one or more new claims in near real-time, such as when the claim data 112 is initially provided to the insurance company. If the real-time claim identifier 108 determines that text strings in the claim data 112 for a new claim satisfy at least one candidate function defined by the candidate function data 106, the real-time claim identifier 108 can determine that the new claim should be assigned to the second destination 102B rather than the first destination 102A.

Claim data, such as historical claim data 110 associated with previously-processed claims or claim data 112 associated with new claims, can include loss descriptions and other information associated with the claims. The loss descriptions can include free-form or unstructured text based on user input, data inferred or derived from user input, and/or other types of data associated with claims. In some examples, the claim data for a claim can be, or include, a first notice of loss (FNOL) or other type of loss report associated with the claim.

For example, when an individual wants to report a loss and/or file a claim with the insurance company, the individual can call or otherwise contact a representative of the insurance company, such as an agent, a call center representative, a claim handler, or other representative. The individual may provide information about the loss to the representative, for instance by describing details about an accident and/or by responding to questions posed by the representative. The representative can, in turn, input claim data into a loss report associated with the claim, based on the information provided by the individual and/or information inferred by the representative. For example, the representative can draft a loss description that includes a textual description of the circumstances surrounding an automobile accident. The loss report can, for instance, include a description of where the accident occurred, where parties associated with the accident were located at one or more points in time, what actions one or more parties took before, during, and/or after the accident, and/or other information about the accident. In other examples, the insurance company may provide a website, mobile application, or other systems that an individual can use to directly report a loss, file a claim, and/or provide information associated with the claim. For example, a customer of an insurance company may use a website or mobile application to directly file a claim and provide a loss description and/or other claim data without communicating with a representative.

The batch claim identifier 104 can include one or more software elements, computer-readable instructions that are executable by one or more processors of the claim identification system 100, and/or other computer-implemented systems. The batch claim identifier 104 can be configured to use text recognition, natural language processing, and/or other language processing to determine whether a loss description or other claim data associated with a claim includes text that satisfies one or more language processing queries 114. For example, the batch claim identifier 104 can be configured to execute any number of language processing queries 114 on the claim data, such as query 114A, 114B, . . . 114N (wherein "N" represents any number of queries greater than zero).

The queries 114 executed by the batch claim identifier 104 can be associated with the second destination 102B. For example, the queries 114 can be written or configured such that the queries 114 can be satisfied if a loss description in the claim data indicates circumstances that are often associated with shared liability and/or comparative negligence situations. In other examples, the queries 114 can be written or configured such that the queries 114 can be satisfied if a loss description of a claim indicates that the claim is likely to be a certain type of claim, or involve other types of claim processing issues, that the second destination 102B is set up to handle or specialize in. If claim data associated with a claim satisfies one or more of the queries 114, satisfaction of the one or more of the queries 114 can indicate that the claim should be handled by the second destination 102B. In some examples, new claims can be assigned to the first destination 102A by default. However, if claim data for a claim satisfies any of the queries 114 executed by the batch claim identifier 104, the batch claim identifier 104 can flag the claim to be assigned or re-routed to the second destination 102B rather than the default first destination 102A.

Each of the queries 114 executed by the batch claim identifier 104 can be defined to include one or more subqueries 116, and/or at least one logical operator 118 that expresses relationships between the subqueries 116. Queries 114 may be expressed using a syntax of a programming language, domain-specific language, or other type of computer-readable language. For example, a subquery of a query can include syntax for one or more variables, and/or references to functions that can be executed as part of the subquery to find values for the variables. A query can also include syntax expressing at least one logical operator 118 associated with relationships between different subqueries 116 of the query. Accordingly, claim data can satisfy a query if the claim data contains text that the batch claim identifier 104 determines satisfy patterns defined by the subqueries 116 and the at least one logical operator 118 of the query.

As a non-limiting example, the first query 114A shown in FIG. 1 may be coded as "phrase(var(DR1), thesaurus(attempt)) and phrase(var(DR2), thesaurus(attempt))." In this example, the first query 114A contains two subqueries 116, a first subquery 116A and a second subquery 116B, that are joined by an "and" logical operator. The first subquery 116A, "phrase(var(DR1), thesaurus(attempt))," may be configured as a natural language search that uses a "var" function to identify any text string in the loss description that satisfies a first variable for a first driver ("DR1"), and uses a "thesaurus" function to identify a subsequent text string in the loss description that is a synonym for the word "attempt." The second subquery 116B, "phrase(var(DR2), thesaurus(attempt))," may similarly be configured as a natural language search that uses the "var" function to identify any text string in the loss description that satisfies a second variable for a second driver ("DR2"), and uses the "thesaurus" function to identify a subsequent text string in the loss description that is a synonym for the word "attempt." Because the logical operator 118 associated with the first query 114A is an "and" logical operator, the first query 114A can be satisfied overall if claim data includes text that satisfies both the first subquery 116A and the second subquery 116B. In this example, the first query 114A can be designed to detect claims associated with shared liability and/or comparative negligence situations that should be assigned to the second destination 102B, because loss descriptions indicating that two drivers attempted to take actions during circumstances associated with a loss can, in some cases, indicate that both drivers are at least partially at fault.

For instance, the first query 114A in this example can be satisfied if the loss description states, as an example, that "V1 was traveling southbound on Highway 90. As V1 attempted to make a left-hand turn, V2 tried to pass on the left side striking V1 on the driver's side fender." In this example, "V1" can be a shorthand term for "vehicle 1" driven by a first driver, and the batch claim identifier 104 can determine that "V1" satisfies the "var(DR1)" function expression of the first subquery 116A. Similarly, in this example, "V2" can be shorthand for "vehicle 2" driven by a second driver, and the batch claim identifier 104 can determine that "V2" satisfies the "var(DR2)" function expression of the second subquery 116B. The batch claim identifier 104 can further determine that the words "attempted" and "tried" in the loss description satisfy the "thesaurus(attempt)" function expressions of the first subquery 116A and the second subquery 116B. Accordingly, in this example, the batch claim identifier 104 can determine that the loss description satisfies the first query 114A overall, because the words "V1 attempted" in the loss description satisfies the first subquery 116A ("phrase(var(DR1), thesaurus(attempt))"), because the words "V2 tried" in the loss description satisfies the second subquery 116B ("phrase(var(DR2), thesaurus(attempt))"), and because the "and" logical operator is satisfied due to satisfaction of both the first subquery 116A and the second subquery 116B.

As will be discussed further below, when the batch claim identifier 104 determines that a word, phrase, or other text string in claim data satisfies a subquery of a query, that text string can be added to candidate function data 106 that corresponds to the subquery and the query. For instance, in the example above, if the batch claim identifier 104 determines that the words "V1 attempted" in the loss description satisfies the first subquery 116A ("phrase(var(DR1), thesaurus(attempt))"), the words "V1 attempted" can be added to the candidate function data 106 that corresponds with the first subquery 116A of the first query 114A. The real-time claim identifier 108 can use the candidate function data 106 to evaluate new claim data 112 without executing queries 114, as will be discussed further below.

If the batch claim identifier 104 determines that the claim data for the claim satisfies the first query 114A, the batch claim identifier 104 can determine that the claim may be likely to involve comparative negligence issues. The batch claim identifier 104 can accordingly output flagged claim data indicating that the claim is flagged for assignment to the second destination 102B that handles comparative negligence claims.

However, if the batch claim identifier 104 determines that the claim data for the claim does not satisfy the first query 114A, the batch claim identifier 104 can determine whether the claim data satisfies one or more other queries 114 associated with the second destination 102B, such as the second query 114B or any number of other queries 114N. Each query can include a unique set of one or more subqueries 116 and/or logical operators. For example, the second query 114B can be configured to be satisfied if the loss description includes text that corresponds to a third subquery and also includes text that corresponds to a fourth subquery, unless the loss description also includes text that corresponds to a fifth subquery. For instance, the second query 114B may have an "and" logical operator that requires satisfaction of both the third subquery and the fourth subquery, and a "not" logical operator that indicates that the second query 114B is not satisfied overall if text satisfying the fifth subquery is present in claim data.

Overall, if the batch claim identifier 104 determines that the claim data for the claim satisfies at least one of the queries 114 associated with the second destination 102B, the batch claim identifier 104 can output flagged claim data indicating that the claim should be assigned to the second destination 102B. In some examples, if the batch claim identifier 104 determines that the claim data for the claim does not satisfy any of the queries 114 associated with the second destination 102B, the batch claim identifier 104 can output flagged claim data indicating that the claim should be assigned to the first destination 102A, should not be assigned to the second destination 102B, or should be assigned to any other destination different from the second destination 102B. In other examples, the claim may have been initially assigned to the first destination 102A by default. In these examples, if the batch claim identifier 104 determines that the claim data for the claim does not satisfy any of the queries 114 associated with the second destination 102B, the batch claim identifier 104 may permit the claim to be assigned to the default first destination 102A by not outputting an indication that the claim should be assigned or re-routed to the second destination 102B.

The batch claim identifier 104 may be configured to operate on claim data for a set of claims on a periodic basis, an occasional basis, an on-demand basis, or on any other basis or schedule. For example, the batch claim identifier 104 can be configured to operate on a daily basis, or any other periodic basis, to execute queries on claim data for a batch of claims received at least one day earlier. The batch claim identifier 104 can also be configured to output flagged claim data for a set of claims processed by the batch claim identifier 104. In some examples, a claims handler or other worker can manually review the flagged claim data for a set of claims, and can determine at block 120 whether individual claims are flagged for the second destination 102B. In other examples, an automated system can review flagged claim data, produced by the batch claim identifier 104 for a set of claims at block 120, to determine whether individual claims are flagged for the second destination 102B. Claims that are flagged by the batch claim identifier 104 for the second destination 102B can be assigned or routed to the second destination 102B. Claims that are not flagged by the batch claim identifier 104 can be assigned or routed to the first destination 102A, for instance by default.

Although the batch claim identifier 104 can identify and flag claims for assignment or reassignment to the second destination 102B instead of the first destination 102A, the natural language queries 114 executed by the batch claim identifier 104, batch processing of claim data by the batch claim identifier 104, and/or later review of flagged claim data generated by the batch claim identifier 104, can take time and use a significant amount of computing resources. To increase the speed at which claims can be identified as being suitable to assign to the second destination 102B, and/or to reduce the number of claims processed by the batch claim identifier 104, the real-time claim identifier 108 can be configured to process claim data for new claims instead of, or in addition to, the batch claim identifier 104.

In particular, the real-time claim identifier 108 can use candidate functions 122, based on the candidate function data 106 generated based on natural language queries 114 executed by the batch claim identifier 104 on historical claim data 110, on claim data 112 for new claims to identify specific new claims that should be assigned or reassigned to the second destination 102B. The real-time claim identifier 108 can use the candidate functions 122 to identify such claims substantially in real-time, for example when claim data for a new claim is first received by the insurance company.

The candidate function data 106 can be stored in a database or other data repository stored in memory associated with the claim identification system 100. The candidate function data 106 can include data associated with different candidate functions 122 that correspond to the different queries 114 used in the batch claim identifier 104, such as candidate functions 122A, 122B, . . . 122N (wherein "N" represents any number of candidate functions greater than zero). For example, the candidate function data 106 can include data for a first candidate function 122A that corresponds to the first query 114A used in the batch claim identifier 104, a second candidate function 122B that corresponds to the second query 114B used in the batch claim identifier 104, and/or other candidate functions 122N that correspond to other queries 114N used in the batch claim identifier 104.

The candidate function data 106 can include, for each individual candidate function, string sets 124 that correspond to individual subqueries 116 of queries 114 executed by the batch claim identifier 104. The string sets 124 can include text strings that the batch claim identifier 104 identified, in historical claim data 110, as having satisfied corresponding subqueries 116 of queries 114. For example, data for the first candidate function 122A can include a first string set 124A that includes one or more words, phrases, or other text strings found in historical claim data 110 that the batch claim identifier 104 determined satisfy the first subquery 116A of the first query 114A. The data for the first candidate function 122A can also include a second string set 124B that includes one or more other words, phrases, or other text strings found in historical claim data 110 that the batch claim identifier 104 determined satisfy the second subquery 116B of the first query 114A. The candidate function data 106 can also indicate, for each individual candidate function, the at least one logical operator 118 used in the corresponding query at the batch claim identifier 104.

For example, when the batch claim identifier 104 processed historical claim data 110 associated with a previously-received claim, the batch claim identifier 104 may have determined that the phrase "V1 attempted" is a text string that satisfies the first subquery 116A ("phrase(var (DR1), thesaurus(attempt))") of the first query 114A in the example discussed above. Accordingly, the "V1 attempted" text string, identified in the historical claim data 110 as being a text string that satisfies the first subquery 116A, can be stored as part of the first string set 124A in the data for the first candidate function 122A that corresponds to the first subquery 116A of the first query 114A. Similarly, the "V2 tried" text string that satisfies the second subquery 116B ("phrase(var(DR2), thesaurus(attempt))") of the first query 114A in the example discussed above, can have been identified in historical claim data 110 by the batch claim identifier 104. Accordingly, the phrase "V2 tried" can be stored as part of the second string set 124B in the data for the first candidate function 122A that corresponds to the second subquery 116B of the first query 114A. Additionally, because the first query 114A includes the "and" logical operator in this example, the data for the first candidate function 122A can also identify the "and logical operator. Overall, the data for the first candidate function 122A can indicate that, due to the "and" logical operator, claim data 112 can satisfy the first candidate function 122A if the claim data 112 includes at least one text string found within the first string set 124A, and also includes at least one text string found within the second string set 124B.

The historical claim data 110 can be a set of claim data 112 processed by the batch claim identifier 104 over a period of time. For example, the historical claim data 110 can be claim data 112 for claims received during a period of time in which the batch claim identifier 104 is configured to be a primary system for outputting flagged claim data and/or for determining destinations 102 for claims. Over time, as the batch claim identifier 104 identifies text strings in the historical claim data 110 that satisfy subqueries 116 of queries 114, the identified text strings can be added to corresponding string sets 124 in the candidate function data 106. The batch claim identifier 104 can accordingly process claims over a period of time, such as weeks, months, or years, to identify sets of unique text strings in historical claim data 110 that satisfy subqueries 116 of queries 114, and to in turn build up corresponding string sets 124 of different candidate functions 122 associated with the queries 114. The individual string sets 124 of different candidate functions 122 can thus be built up over a period of time to include more and more text strings identified from historical claim data 110.

For example, although in the example discussed above the batch claim identifier 104 can identify the phrase "V1 attempted" as satisfying the first subquery 116A of the first query 114A based on claim data for one claim, the batch claim identifier 104 can also identify other text strings from historical claim data 110 for other claims that also satisfy the first subquery 116A of the first query 114A. For instance, over time the batch claim identifier 104 can determine that other text strings, such as "I tried to," "D1 attempted to," "D1 proceeded to," "D1 went to," "V1 continued to," "V1 failed to," V1 goes forward," "V1 kept," and/or other text strings also satisfy the first subquery 116A ("phrase(var (DR1), thesaurus(attempt))") of the first query 114A in the example discussed above. When such other text strings are identified as satisfying the first subquery 116A of the first query 114A, the identified text strings can be added to the first string set 124A in the data for the first candidate function 122A in the candidate function data 106.

In some examples, an identified text string can be added to a string set in the candidate function data 106 if that text string appears in historical claim data 110 at least a threshold number of times. For example, a particular text string identified as satisfying a subquery of a query can be added to a corresponding string set if the particular text string is identified by the batch claim identifier 104 as satisfying the subquery at least three times, or any other threshold number of times, in historical claim data 110 over a period of three months, or any other period of time. In other examples, a text string can be added to a string set in the candidate function data 106 once it has been identified by the batch claim identifier 104 as satisfying a corresponding subquery at least once in the historical claim data 110.

After the candidate function data 106 has been generated, over a period of time based on historical claim data 110 processed by the batch claim identifier 104, the real-time claim identifier 108 can use the candidate function data 106 to process claim data 112 for new claims without executing queries 114. For example, the candidate function data 106 can be provided to, and/or be used by, the real-time claim identifier 108, such that the real-time claim identifier 108 can execute one or more candidate functions 122 based on the string sets 124 and logical operators associated with the candidate functions 122. The real-time claim identifier 108 can accordingly execute one or more candidate functions 122, instead of queries 114, against received claim data 112, such as claim data 112 for a new claim that has recently been received by the insurance company. In some examples, the claim data 112 can be an FNOL, or other loss description, for a claim that is provided to the real-time claim identifier 108 when the claim data 112 is generated or received by the insurance company.

The real-time claim identifier 108 can include one or more software elements, computer-readable instructions that are executable by one or more processors of the claim identification system 100, and/or other computer-implemented systems. The real-time claim identifier 108 can be configured to execute one or more of the candidate functions 122, defined by the candidate function data 106, on new claim data 112 at blocks 126. For example, the real-time claim identifier 108 can execute a particular candidate function by performing text searches and/or text string comparisons on the claim data 112, to determine if the claim data 112 includes text strings within the string sets 124 of the particular candidate function, in a combination or pattern associated with the one or more logical operators of the particular candidate function. The candidate functions 122 executed by the real-time claim identifier 108 can approximate the queries 114 used in the batch claim identifier 104. However, the candidate functions 122 can be executed using text searches and/or text string comparisons based on the pre-determined string sets 124, instead of executing full language processing queries 114 that may search for any text that matches defined variable expressions. Such candidate functions 122 can accordingly, in many examples, be executed in near real-time, more quickly than full language processing queries 114 can be executed. Similarly, text searches and/or text string comparisons associated with such candidate functions 122 can be executed with the use of fewer processing cycles, memory, and/or other computing resources than full language processing queries 114.

As an example, at block 126A, the real-time claim identifier 108 can execute the first candidate function 122A based on data for the first candidate function 122A in the candidate function data 106. For instance, based on an "and" logical operator associated with the first candidate function 122A, the real-time claim identifier 108 can determine if the claim data 112 includes at least one text string in the first string set 124A, and also includes at least one text string in the second string set 124B.

As a non-limiting example, the first string set 124A of the first candidate function 122A can be a set of predetermined text strings such as "V1 tried," "V1 attempted," and "I tried to." The second string set 124B of the first candidate function 122A can be a set of predetermined text strings such as "V2 tried," "V2 attempted," and "V2 failed to." In this example, the real-time claim identifier 108 can determine at block 126A that the claim data 112 satisfies the first candidate function 122A if the claim data 112 includes a loss description that includes the text string "V1 attempted" (one of the text strings in the first string set 124A) and, based on the "and" logical operator, also includes the text string "V2 failed to" (one of the text strings in the second string set 124B). However, if the claim data 112 instead included the text strings "V1 tried" and "V2 attempted," the real-time claim identifier 108 can also determine at block 126A that the claim data 112 satisfies the first candidate function 122A, because the claim data 112 includes at least one of the text strings in the first string set 124A and also includes at least one of the text strings in the second string set 124B. Due to the "and" logical operator, if the claim data 112 instead includes "V1 attempted" or another text string in the first string set 124A, but does not include any of the text strings in the second string set 124B, the real-time claim identifier 108 can determine at block 126A that the claim data 112 does not satisfy the first candidate function 122A.

In some examples, if the real-time claim identifier 108 determines at block 126A that the claim data 112 includes a combination of text strings that satisfy the first candidate function 122A, the real-time claim identifier 108 can directly assign the claim to the second destination 102B. If the claim has been, or would have been, routed to the first destination 102A by default, the real-time claim identifier 108 can re-route or re-assign the claim to the second destination 102B. In other examples, the real-time claim identifier 108 can otherwise flag the claim to be automatically assigned or re-assigned to the second destination 102B by an automatic claim router or other automatic claim assignment system. In some examples, such an automatic claim router or other automatic claim assignment system can initially provide the claim data 112 to the real-time claim identifier 108, for instance using an application programming interface (API), to obtain a message from the real-time claim identifier 108 indicating whether the claim should be assigned to the second destination 102B.

However, if the real-time claim identifier 108 determines at block 126A that the claim data 112 does not include text strings that satisfy the first candidate function 122A, the real-time claim identifier 108 can determine whether the claim data 112 includes text strings that satisfy at least one of the other candidate functions 122 defined by the candidate function data 106. For example, the real-time claim identifier 108 can determine at block 126B whether the claim data 112 includes text strings that satisfy the second candidate function 122B, for instance according to string sets 124 and one or more logical operators of the second candidate function 122B. If the claim data 112 does include text strings that satisfy the second candidate function 122B, the real-time claim identifier 108 can similarly cause the claim to be assigned or re-assigned to the second destination 102B. Overall, if the real-time claim identifier 108 determines that the claim data 112 includes text strings that satisfy at least one of the candidate functions 122 defined in the candidate function data 106, the real-time claim identifier 108 can cause the claim to be assigned or re-assigned to the second destination 102B.

In some examples, if the real-time claim identifier 108 determines that the claim data 112 for the new claim does not include text strings that satisfy least one of the candidate functions 122 defined in the candidate function data 106, the real-time claim identifier 108 may cause the new claim to be assigned to the first destination 102A. In some examples, the new claim may have been assigned by default to the first destination 102A, and the real-time claim identifier 108 can allow that default assignment to stand without modification if the claim data 112 for the new claim does not satisfy any of the candidate functions 122.

In other examples, if the real-time claim identifier 108 determines that the claim data 112 for the new claim does not include text strings that satisfy least one of the candidate functions 122 defined in the candidate function data 106, the claim data 112 for the new claim can be routed to the batch claim identifier 104 for further processing. In some cases, the claim data 112 for the new claim may contain text strings that the batch claim identifier 104 has not previously identified as satisfying subqueries 116 of queries 114. However, upon receiving the claim data 112 for the new claim, the batch claim identifier 104 can execute the queries 114 using text recognition, natural language processing, and/or other language processing as described above. In some situations, the batch claim identifier 104 may determine that the claim data 112 for the new claim does not include text strings that satisfy any of the queries 114, and accordingly allow or cause the new claim to be assigned to the first destination 102A.

However, in other situations, the batch claim identifier 104 may instead determine that the claim data 112 for the new claim does include one or more text strings that satisfy one or more of the subqueries 116 of its queries 114, but that were not previously encountered in the historical claim data 110 and thus have not yet been added to corresponding string sets 124 in the candidate function data 106. For example, a text string such as "V1 proceeded to" in the claim data 112 may not have been previously identified in historical claim data 110 as satisfying the first subquery 116A ("phrase(var (DR1), thesaurus(attempt))") of the first query 114A, because the text string "V1 proceeded to" was not included in any of the historical claim data 110. However, the batch claim identifier 104 may determine using language processing that "V1 proceeded to" does satisfy the first subquery 116A of the first query 114A, and that the claim data 112 satisfies the first query 114A overall. Accordingly, in this situation, the batch claim identifier 104 can flag the new claim for assignment or reassignment to the second destination 102B.

Additionally, any text strings that are newly identified by the batch claim identifier 104 in the new claim data 112 as satisfying subqueries 116 of queries 114 can also be added to corresponding string sets 124 in the candidate function data 106. For example, if the text string "V1 proceeded to" is newly identified by the batch claim identifier 104 as satisfying the first subquery 116A ("phrase(var(DR1), thesaurus(attempt))") of the first query 114A, as discussed above, "V1 proceeded to" can be added to the first string set 124A in the data for the first candidate function 122A in the candidate function data 106. An updated version of the candidate function data 106, including newly identified text strings added to string sets 124 of one or more candidate functions 122, can be provided to the real-time claim identifier 108 automatically, on a periodic basis, or on demand. Accordingly, the real-time claim identifier 108 can use the updated candidate function data 106 to determine when subsequent claim data 112 satisfies any of the updated candidate functions 122.

Because the real-time claim identifier 108 can, in near real-time, identify claims to be assigned to the second destination 102B, in some examples the identified claims can be assigned to the second destination 102B before they reach the batch claim identifier 104. This can filter out claims that are likely to be assigned to the second destination 102B, and thereby reduce the number of claims that are provided to the batch claim identifier 104 for further processing. This reduction in the number of claims processed using more intensive language processing queries 114 by the batch claim identifier 104 can also reduce the amount of computing resources used by the batch claim identifier 104, and/or increase the speed by which the batch claim identifier 104 processes a batch of claims.

For example, the string sets 124 of various candidate functions 122 in the candidate function data 106 can be built up over time, based on text strings identified by the batch claim identifier 104 as satisfying subqueries 116 of queries 114, such that the real-time claim identifier 108 can identify a large percentage of claims that the batch claim identifier 104 would have identified as claims to be assigned to the second destination 102B. By way of a non-limiting example, in some tests the real-time claim identifier 108 can identify 96% of claims that would have been identified by the batch claim identifier 104 as being assignable to the second destination 102B. By assigning those 96% of claims to the second destination 102B directly, based on the real-time analysis by the real-time claim identifier 108 instead of passing claim data for those claims through the batch claim identifier 104, the load on the batch claim identifier 104 can be significantly reduced. In examples in which the batch claim identifier 104 produces flagged claim data that can then be used for manual assignment of claims to destination, reducing the number of claims processed by the batch claim identifier 104 can also reduce the number of claims that are manually reviewed and reassigned.

In some examples, claim data for claims with certain attributes indicating that the claims are unlikely to involve comparative negligence issues can be filtered out before the claim data reaches the batch claim identifier 104 and/or the real-time claim identifier 108. For example, in some situations, a filter element of the claim identification system 100 (not shown) can analyze claim data, such as historical claim data 110 or claim data 112, to identify claims for which all parties have insurance coverage from the same insurance company. Claim data for a claim indicating that all parties have insurance coverage from the same insurance company may indicate that a comparative negligence analysis is less relevant, or is less important, to the insurance company than for other claims in which at least one party has insurance coverage from another insurance company. Accordingly, the filter element can cause the claim data for such claims to bypass the batch claim identifier 104 and/or real-time claim identifier 108, such that the claims are assigned among the destinations 102 according to a manual review, by a different automated system, or by another method. As another example, the filter element can analyze claim data to identify insurance claims for losses that occurred in jurisdictions, such as the state of Michigan, in which each party's own insurance covers the damage to that party's own vehicle, such that a comparative negligence analysis to assign relative fault percentages may be unnecessary. Accordingly, the filter element can cause claim data for such claims to bypass the batch claim identifier 104 and/or real-time claim identifier 108, such that the claims are assigned among the destinations 102 according to a manual review, by a different automated system, or by another method. The filter element can accordingly reduce the amount of claim data processed by the batch claim identifier 104 and/or the real-time claim identifier 108.

In some examples, the real-time claim identifier 108 can be periodically or occasionally tested against the batch claim identifier 104 by providing the same claim data 112 to both the real-time claim identifier 108 and the batch claim identifier 104. If the batch claim identifier 104 and the real-time claim identifier 108 provide respective outputs that include differing indications of whether or not a claim should be assigned to the second destination 102B, the candidate function data 106 can be adjusted. For example, the real-time claim identifier 108 may find that text strings in new claim data 112 for a claim satisfies at least one of the candidate functions 122, based in part on string sets 124 previously identified by the batch claim identifier 104 as satisfying one or more subqueries 116 of queries 114, and thus output an indication that the claim should be assigned to the second destination 102B. However, the batch claim identifier 104 may determine from a linguistic analysis that those text strings are used in the new claim data 112 in a different context that does not indicate that the claim should be assigned to the second destination 102B, and output an indication that the claim should not be assigned to the second destination 102B. Based on the differing indications produced by the batch claim identifier 104 and the real-time claim identifier 108 regarding whether the claim should be assigned to the second destination 102B, the claim identification system 100 may indicate that those text strings, and/or the candidate function data 106, are leading to false positives in the real-time claim identifier 108, and should be removed from one or more string sets 124 or not be considered by the real-time claim identifier 108.

As discussed above, the queries 114 can be written or configured such that the queries 114 can be satisfied if a loss description in the claim data indicates circumstances that are often associated with shared liability and/or comparative negligence situations. Accordingly, the candidate function data 106 can be generated, based on the queries 114, such that the candidate functions 122 are also configured to determine if claim data indicates circumstances that are often associated with shared liability and/or comparative negligence situations, and that a corresponding claim should be assigned to the second destination 102B. However, in other examples, queries 114 and candidate function data 106 can be associated with any other claim type or claim processing issue different from, or in addition to, claim types or issues that may be associated with comparative negligence. For example, queries 114 can be written or configured such that the queries 114 can be satisfied if a loss description of a claim indicates that the claim is likely to be a certain type of claim, or involve certain other types of claim processing issues, that the second destination 102B is set up to handle or specialize in. Accordingly, candidate function data 106 for candidate functions 122 can be generated, from such queries 114, that can also indicate whether a claim is likely to be that type of claim or involve those types of claim processing issues, such that the claim should be assigned to the second destination 102B.

Overall, the batch claim identifier 104 can use relatively complex, time-intensive, and/or processor-intensive language processing operations to identify text strings in historical claim data 110 that satisfy subqueries 116 of queries 114. However, the real-time claim identifier 108 can avoid performing such complex, time-intensive, and/or processor-intensive language processing by instead using faster text string comparison operations as part of candidate functions 122. The candidate functions 122 can determine if claim data 112 includes text strings in string sets 124, predetermined by the batch claim identifier 104 as being text strings that satisfy subqueries 116 of queries 114, in a pattern associated with one or more logical operators of the queries 114. The real-time claim identifier 108 can accordingly identify claims that satisfy at least one of the candidate functions 122 in near real-time, and cause the identified claims to be assigned or re-assigned to the second destination 102B instead of the first destination 102A.

Figure 2:
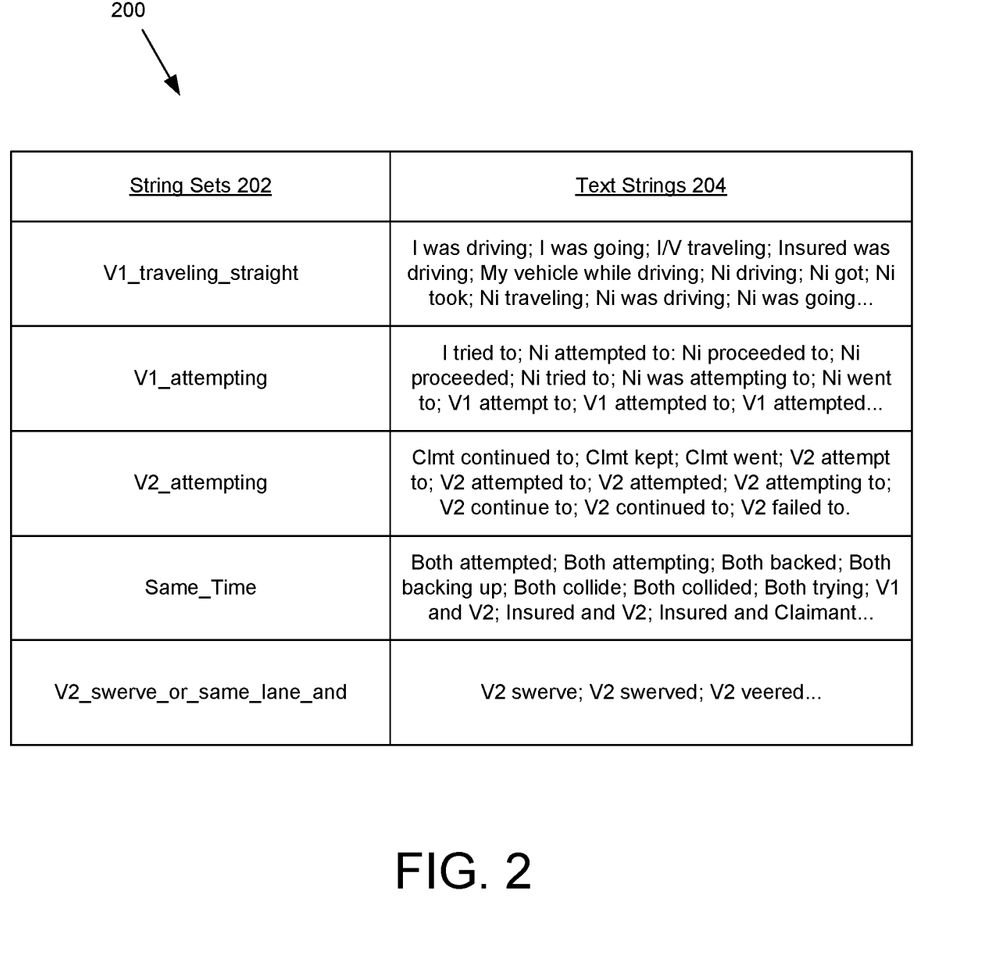
FIG. 2 shows an example of data that can be stored in candidate function data.

FIG. 2 shows a non-limiting example of data 200 that can be stored in the candidate function data 106. As discussed above, the candidate function data 106 can include, for various candidate functions 122, string sets 124 of one or more text strings that the batch claim identifier 104 has determined satisfy corresponding subqueries 116 of queries 114. The example data 200 shown in FIG. 2 includes example string sets 202 that may correspond to queries 114 used in the batch claim identifier 104. The names shown in FIG. 2 may be names for the string sets 202 that at least partially correspond to a subquery. For instance, the "V1_attempting" string set shown in FIG. 2 may correspond to the first subquery 116A discussed in the example above ("phrase(var(DR1), thesaurus(attempt))." The example data 200 shown in FIG. 2 also includes example text strings 204 that may be within each of the strings sets 202. For example, the text strings 204 can have been found in historical claim data 110, and can be text strings that the batch claim identifier 104 determined satisfied corresponding subqueries 116.

For example, FIG. 2 shows that distinct text strings 204, including "I was driving," "I was going," "Insured was driving," and other text strings, have been found to satisfy a subquery associated with the "V1_traveling_straight" string set. In this example, the real-time claim identifier 108 can determine if claim data 112 for a claim contains at least one of the text strings 204 in the "V1_traveling_straight" sting set as part of a determination as to whether the claim data 112 satisfies a corresponding candidate function.

As discussed above, the real-time claim identifier 108 can be configured to determine if claim data 112 contains text strings that are in string sets 124 of at least one candidate function defined by the candidate function data 106, in a pattern associated with at least one logical operator of the candidate function. For example, the candidate function data 106 for a particular candidate function may include the "V1_attempting" string set shown in FIG. 2, may include the "V2_swerve_orsame_lane_and" string set, and may include an "and" logical operator. Accordingly, that the particular candidate function can be satisfied by claim data 112 if the claim data 112 includes at least one text string from the "V1_attempting" string set and at least one text string from the "V2_swerve_orsame_lane_and" string set.

Accordingly, rather than executing full language processing queries 114 that may search for any text that satisfies the queries 114 based on variable functions and other functions, the real-time claim identifier 108 can determine whether claim data 112 satisfies a candidate function by searching the claim data 112 for pre-identified text strings 204 in string sets 202, in some examples in patterns or structures associated with one or more logical operators associated with the candidate function. The real-time claim identifier 108 can accordingly execute the candidate functions 122 on claim data 112 for a claim, to determine whether the claim data 112 should be assigned to the second destination 102B, more quickly and/or with fewer computing resources than the batch claim identifier 104 can execute full language processing queries 114.

Figure 3:
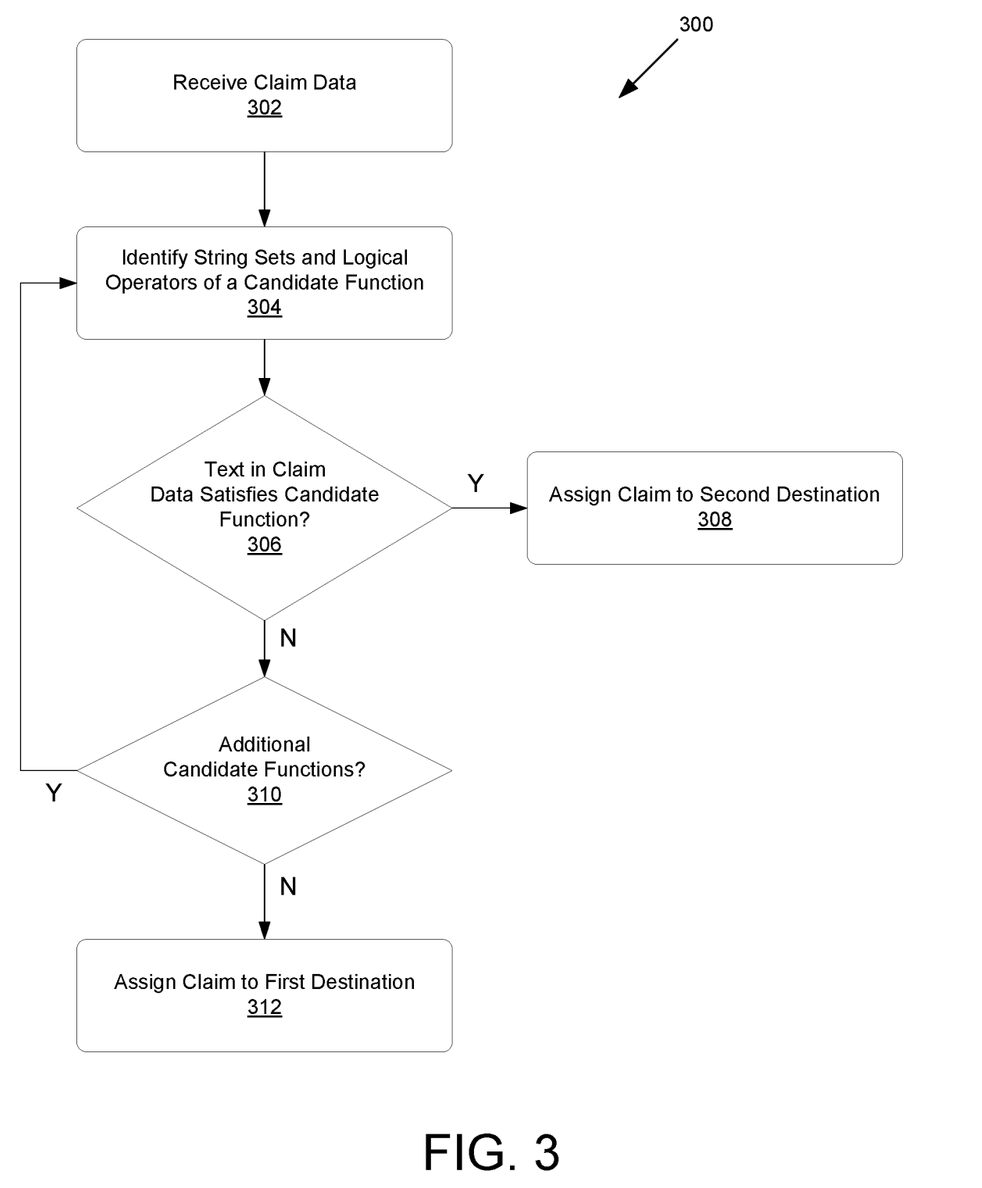
FIG. 3 shows a flowchart illustrating an example method in which a real-time claim identifier can use candidate function data to determine if claim data indicates that a claim is to be assigned to a second destination of a set of destinations instead of a first destination.

FIG. 3 shows a flowchart illustrating an example method 300 in which the real-time claim identifier 108 can use the candidate function data 106 to determine if claim data 112 indicates that a claim is to be assigned to the second destination 102B instead of the first destination 102A. In some examples, a filter element of the claim identification system 100 can filter out claim data 112 for claims that may be unlikely to involve a comparative negligence determination from reaching the real-time claim identifier 108, for instance because all parties associated with a claim have insurance coverage from the same insurance company or because a loss occurred in a jurisdiction for which comparative negligence determinations are irrelevant. Accordingly, in some examples, the claim data 112 analyzed by the real-time claim identifier 108 using method 300 may have at least a threshold chance of involving comparative negligence issues. In other examples, the filter element may be absent, and the real-time claim identifier 108 may use method 300 to process claim data 112 for any claim.

At block 302, the real-time claim identifier 108 can receive claim data 112 for a claim from a claim intake system, or other database or repository of claim data 112. In some examples, the claim data 112 can include a FNOL or other loss report for the claim that has been generated and/or received by the insurance company, such as via a claim intake system used by representatives to input data received from parties when the loss is reported. In these examples, the real-time claim identifier 108 can receive the claim data 112 from the claim intake system.

At block 304, the real-time claim identifier 108 can identify string sets 124 and one or more logical operators associated with a particular candidate function in the candidate function data 106. For example, for the first candidate function 122A shown in FIG. 1, the real-time claim identifier 108 can identify the first string set 124A, the second string set 124B, and the logical operator 118.

At block 306, the real-time claim identifier 108 can determine if text strings present in the claim data 112 satisfy the particular candidate function, based on the string sets 124 and logical operators associated with that particular candidate function that were identified during block 304. For example, if the string sets 124 identified during block 304 are the first string set 124A and the second string set 124B of the first candidate function 122A shown in FIG. 1, and the first candidate function 122A is associated with an "and" logical operator, the real-time claim identifier 108 can determine that the claim data 112 satisfies the first candidate function 122A if the claim data 112 includes at least one text string in the first string set 124A and also includes at least one text string in the second string set 124B. As another example, if a candidate function includes three string sets 124, an "or" logical operator indicates that text strings at least one of the first two string sets 124 should be present in claim data 112, and a "not" logical operator indicates that text strings in the third string set should not be present in claim data 112, the candidate function can be satisfied if the claim data 112 includes at least one text string in either of the first two string sets 124 and does not include any of the text strings in the third string set.

If the real-time claim identifier 108 determines at block 306 that the claim data 112 satisfies the particular candidate function (Block 306—Yes), the real-time claim identifier 108 can cause the claim to be assigned to the second destination 102B at block 308. In some examples, the real-time claim identifier 108 can directly assign, re-assign, route, or re-route the claim to the second destination 102B. In other examples, the real-time claim identifier 108 can generate data for a separate automatic claim routing system indicating that the claim should be assigned or routed to the second destination 102B.

However, if the real-time claim identifier 108 does not determine at block 306 that the claim data 112 satisfies the particular candidate function (Block 306—No), the real-time claim identifier 108 can determine if the candidate function data 106 defines any additional candidate functions 122 that the real-time claim identifier 108 has not yet considered or executed. For example, if the real-time claim identifier 108 evaluated the claim data 112 based on the first candidate function 122A, the real-time claim identifier 108 may not yet have evaluated the claim data 112 based on the second candidate function 122B or other candidate functions 122N in the candidate function data 106. If the candidate function data 106 does include any additional candidate functions 122 that the real-time claim identifier 108 has not yet considered or executed, the real-time claim identifier 108 can identify string sets 124 and logical operators associated with one of those candidate functions 122 at block 304, and can determine if the claim data 112 satisfies the candidate function at block 306.

In some examples, if the real-time claim identifier 108 ultimately determines that claim data 112 for the claim does not satisfy any of the candidate functions 122 defined in the candidate function data 106, the real-time claim identifier 108 can cause the claim to be assigned to the first destination 102A at block 312. For instance, the real-time claim identifier 108 can indicate that the claim should be assigned to the first destination 102A, or not override a default initial assignment of the claim to the first destination 102A.

In alternate examples, if the real-time claim identifier 108 ultimately determines that claim data 112 does not satisfy any of the candidate functions 122 defined in the candidate function data 106, the real-time claim identifier 108 can route the claim data 112 to the batch claim identifier 104 for further processing. The batch claim identifier 104 may evaluate the claim data 112 using one or more queries 114 to determine if the claim data 112 includes any text strings that satisfy one or more subqueries 116 of one or more queries 114, and that can be added to corresponding string sets 124 in the candidate function data 106. The batch claim identifier 104 can also use the queries 114 to determine if the claim data 112 indicates that the claim should be flagged for assignment to the second destination 102B.

Overall, the real-time claim identifier 108 can use one or more candidate functions 122 as part of method 300 to determine if claim data 112 indicates that a claim is to be assigned to the second destination 102B, without the real-time claim identifier 108 executing the queries 114. Accordingly, the real-time claim identifier 108 can use method 300 to identify claims that should be assigned to the second destination 102B more quickly, and/or with fewer computing resources, than the batch claim identifier 104 can identify such claims based on executing full language processing queries 114.

Figure 4:
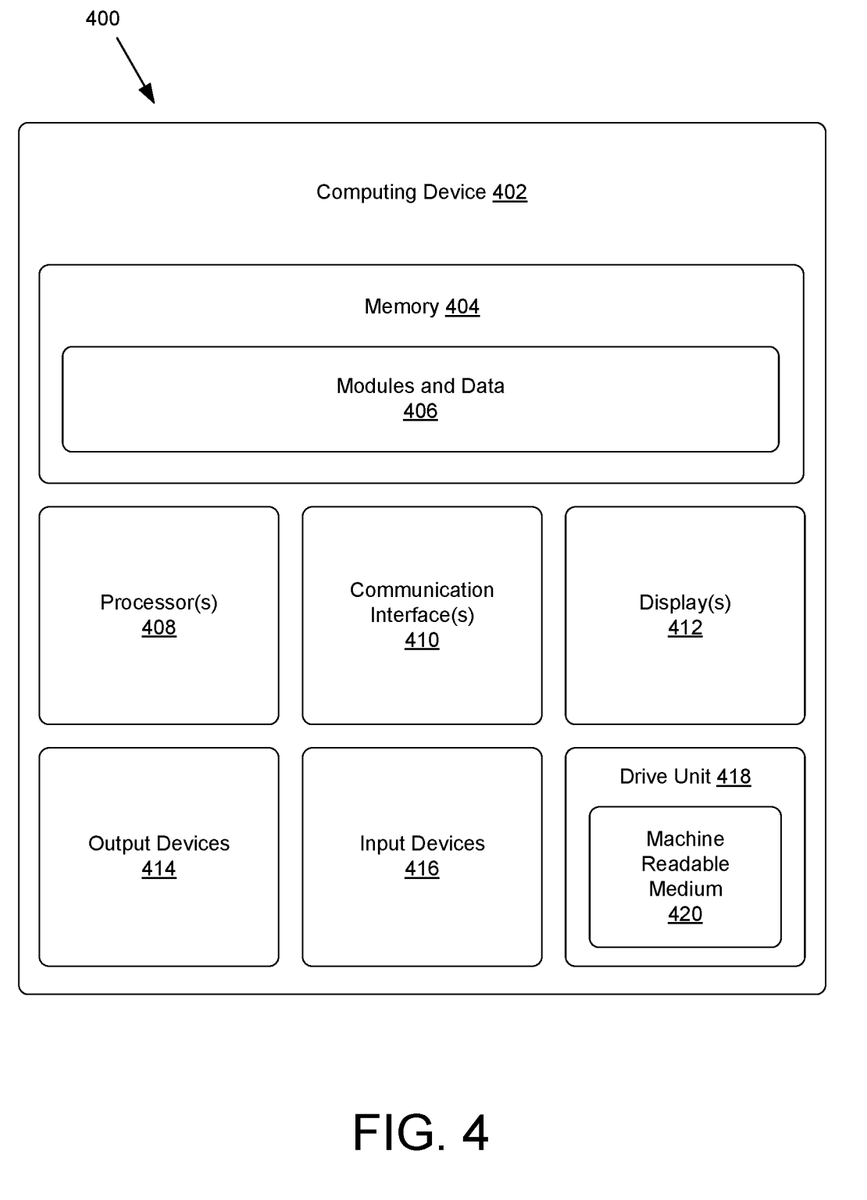
FIG. 4 shows an example system architecture for a computing device associated with the claim identification system.

FIG. 4 shows an example system architecture for a computing device 402 associated with the claim identification system 100 described herein. A computing device 402 can be a server, computer, or other type of computing device that executes at least a portion of the claim identification system 100. In some examples, elements of the claim identification system 100 can be distributed among, and/or be executed by, multiple computing devices 402. For example, one computing device can execute the batch claim identifier 104, while one or more other computing device can store the candidate function data 106 and/or execute the real-time claim identifier 108.

A computing device 402 can include memory 404. In various examples, the memory 404 can include system memory, which may be volatile (such as RAM), non-volatile (such as ROM, flash memory, etc.) or some combination of the two. The memory 404 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 402 associated with the claim identification system 100. Any such non-transitory computer-readable media may be part of the computing devices 402.

The memory 404 can store modules and data 406. The modules and data 406 can include one or more of the batch claim identifier 104, the candidate function data 106, or the real-time claim identifier 108 described above. Additionally, or alternately, the modules and data 406 can include any other modules and/or data that can be utilized by the claim identification system 100 to perform or enable performing any action taken by the claim identification system 100. Such other modules and data can include a platform, operating system, and applications, and data utilized by the platform, operating system, and applications.

One or more computing devices 402 of the claim identification system 100 can also have processor(s) 408, communication interfaces 410, displays 412, output devices 414, input devices 416, and/or a drive unit 418 including a machine readable medium 420.

In various examples, the processor(s) 408 can be a central processing unit (CPU), a graphics processing unit (GPU), both a CPU and a GPU, or any other type of processing unit. Each of the one or more processor(s) 408 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 408 may also be responsible for executing computer applications stored in the memory 404, which can be associated with types of volatile (RAM) and/or nonvolatile (ROM) memory.

The communication interfaces 410 can include transceivers, modems, interfaces, antennas, telephone connections, and/or other components that can transmit and/or receive data over networks, telephone lines, or other connections.

The display 412 can be a liquid crystal display or any other type of display commonly used in computing devices. For example, a display 412 may be a touch-sensitive display screen, and can then also act as an input device or keypad, such as for providing a soft-key keyboard, navigation buttons, or any other type of input.

The output devices 414 can include any sort of output devices known in the art, such as a display 412, speakers, a vibrating mechanism, and/or a tactile feedback mechanism. Output devices 414 can also include ports for one or more peripheral devices, such as headphones, peripheral speakers, and/or a peripheral display.

The input devices 416 can include any sort of input devices known in the art. For example, input devices 416 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 420 can store one or more sets of instructions, such as software or firmware, that embodies any one or more of the methodologies or functions described herein. The instructions can also reside, completely or at least partially, within the memory 404, processor(s) 408, and/or communication interface(s) 410 during execution thereof by the one or more computing devices 402 of the claim identification system 100. The memory 404 and the processor(s) 408 also can constitute machine readable media 420.

Overall, the candidate function data 106 generated over time from analyses of historical claim data 110 by the batch claim identifier 104 can be used by the real-time claim identifier 108 to determine, in near real-time, if claim data 112 for a new claim indicates that the new claim should be assigned to the second destination 102B. The real-time claim identifier 108 can use candidate functions 122 defined by the candidate function data 106 to determine if the claim data 112 satisfies at least one candidate function, and if so assign the claim to the second destination 102B. The real-time claim identifier 108 can use the candidate functions 122 to identify claims to be assigned to the second destination 102B more quickly, and/or with fewer computing resources, than language processing queries 114 performed by the batch claim identifier 104. Additionally, by using the real-time claim identifier 108 to identify and assign claims to the second destination 102B in near real-time, in some examples claim data 112 for such claims can be filtered out and be assigned to the second destination 102B before the claim data 112 reaches the batch claim identifier 104. This can reduce the load on the batch claim identifier 104, for instance by reducing the number of claims processed by the batch claim identifier 104 and/or reducing the amount of computing resources used by the batch claim identifier 104.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
   generating, by a batch claim identifier of a claim identification system, a first string set and a second string set by executing, on instances of a historical claim data, a language processing query expressed using a syntax of a computer-readable language to identify:
   first text strings, of the first string set, that satisfy a first subquery of the language processing query, the language processing query being further configured to identify insurance claims that are to be assigned to a particular destination, and
   second text strings, of the second string set, that satisfy a second subquery of the language processing query;
   obtaining, by the claim identification system, claim data associated with an insurance claim;
   identifying, by the claim identification system, a candidate function associated with the particular destination for the insurance claim, wherein the candidate function comprises:
   the first string set comprising the first text strings that have been identified as satisfying the first subquery of the language processing query;
   the second string set comprising the second text strings that have been identified as satisfying the second subquery of the language processing query; and
   at least one logical operator that relates the first string set and the second string set;
   determining, by the claim identification system, that the claim data satisfies the candidate function by determining, without executing the language processing query, that one or more text strings in at least one of the first string set and the second string set are present within the claim data in a pattern corresponding to the at least one logical operator; and
   assigning, by the claim identification system, the insurance claim to the particular destination, based on determining that the claim data satisfies the candidate function.

2. The method of claim 1, wherein:
   the identifying, the determining, and the assigning are performed by a real-time claim identifier of the claim identification system, and
   the real-time claim identifier is different from the batch claim identifier of the claim identification system that is configured to execute the language processing query on the instances of the historical claim data.

3. The method of claim 1, further comprising:
   obtaining, by the claim identification system, second claim data associated with a second insurance claim;
   determining, by the claim identification system, that the second claim data does not satisfy the candidate function; and
   providing, by the claim identification system, the second claim data to the batch claim identifier that is configured to perform the language processing query, associated with the particular destination, on the second claim data to determine whether to assign the second insurance claim to the particular destination or to a second destination.

4. The method of claim 1, wherein:
   the particular destination is a comparative negligence group of workers, associated with an insurance company, that handles insurance claims that involve comparative negligence issues, and
   the candidate function is configured to determine whether the insurance claim is likely to involve the comparative negligence issues and is to be assigned to the comparative negligence group.

5. The method of claim 1, wherein:
   the candidate function is a first candidate function of a plurality of candidate functions,
   the plurality of candidate functions corresponds with a plurality of language processing queries configured to identify the insurance claims that are to be assigned to the particular destination, and the method further comprises:
obtaining, by the claim identification system, second claim data associated with a second insurance claim;
determining, by the claim identification system, that the second claim data does not satisfy the first candidate function;
determining, by the claim identification system, that the second claim data satisfies a second candidate function of the plurality of candidate functions, without executing a second language processing query of the plurality of language processing queries that corresponds to the second candidate function; and
assigning, by the claim identification system, the second insurance claim to the particular destination, based on determining that the second claim data satisfies the second candidate function.

6. The method of claim 1, wherein the candidate function further comprises:
a third string set comprising third text strings that have been identified as satisfying a third subquery of the language processing query; and
an additional logical operator that relates at least one of the first string set or the second string set with the third string set.

7. The method of claim 3, wherein:
performance of the language processing query, by the batch claim identifier, and on the second claim data, identifies a new text string within the second claim data that satisfies one of the first subquery or the second subquery, and
the method further comprises adding, by the claim identification system, the new text string to the first string set that corresponds to the first subquery or to the second string set that corresponds to the second subquery.

8. A computing system, comprising:
one or more processors; and
memory storing computer-executable instructions that, when executed by the one or more processors, cause the computing system to perform operations comprising:
generating, by a batch claim identifier, a first string set and a second string set by executing, on instances of a historical claim data, a language processing query expressed using a syntax of a computer-readable language to identify:
first text strings, of the first string set, that satisfy a first subquery of the language processing query, the language processing query being further configured to identify insurance claims that are likely to involve comparative negligence issues and are to be assigned to a comparative negligence group of workers within an insurance company, and
second text strings, of the second string set, that satisfy a second subquery of the language processing query;
obtaining claim data associated with an insurance claim;
identifying a candidate function configured to determine whether the insurance claim is likely to involve the comparative negligence issues, wherein the candidate function is associated with the comparative negligence group, and the candidate function comprises:
the first string set comprising the first text strings that have been identified as satisfying the first subquery of the language processing query;
the second string set comprising the second text strings that have been identified as satisfying the second subquery of the language processing query; and
at least one logical operator that relates the first string set and the second string set;
determining that the claim data satisfies the candidate function by determining, without executing the language processing query, that one or more text strings in at least one of the first string set and the second string set are present within the claim data in a pattern corresponding to the at least one logical operator; and
assigning the insurance claim to the comparative negligence group, based on determining that the claim data satisfies the candidate function.

9. The computing system of claim 8, wherein:
the identifying, the determining, and the assigning are performed by a real-time claim identifier, and
the real-time claim identifier is different from the batch claim identifier configured to execute the language processing query on the instances of the historical claim data.

10. The computing system of claim 8, wherein the operations further comprise:
obtaining second claim data associated with a second insurance claim;
determining that the second claim data does not satisfy the candidate function; and
providing the second claim data to the batch claim identifier that is configured to perform the language processing query, associated with the comparative negligence group, on the second claim data to determine whether to assign the second insurance claim to the comparative negligence group or to a second group of workers.

11. The computing system of claim 8, wherein:
the candidate function is a first candidate function of a plurality of candidate functions,
the plurality of candidate functions corresponds with a plurality of language processing queries configured to identify the insurance claims that are likely to involve the comparative negligence issues and are to be assigned to the comparative negligence group, and
the operations further comprise:
obtaining second claim data associated with a second insurance claim;
determining that the second claim data does not satisfy the first candidate function;
determining that the second claim data satisfies a second candidate function of the plurality of candidate functions, without executing a second language processing query of the plurality of language processing queries that corresponds to the second candidate function; and
assigning the second insurance claim to the comparative negligence group, based on determining that the second claim data satisfies the second candidate function.

12. The computing system of claim 10, wherein:
performance of the language processing query, by the batch claim identifier, and on the second claim data, identifies a new text string within the second claim data that satisfies one of the first subquery or the second subquery, and the operations further comprise adding the new text string to the first string set that corresponds to the first subquery or to the second string set that corresponds to the second subquery.

13. One or more non-transitory computer-readable media storing computer-executable instructions that, when executed by one or more processors, cause the one or more processors to perform operations, comprising:
- generating, by a batch claim identifier, a first string set and a second string set by executing, on instances of a historical claim data, a language processing query expressed using a syntax of a computer-read able language to identify:
  - first text strings, of the first string set, that satisfy a first subquery of the language processing query, the language processing query being further configured to identify insurance claims that are to be assigned to a particular destination, and
  - second text strings, of the second string set, that satisfy a second subquery of the language processing query;
- obtaining claim data associated with an insurance claim;
- identifying a candidate function associated with the particular destination for the insurance claim, wherein the candidate function comprises:
  - the first string set comprising the first text strings that have been identified as satisfying the first subquery of the language processing query;
  - the second string set comprising the second text strings that have been identified as satisfying the second subquery of the language processing query; and
  - at least one logical operator that relates the first string set and the second string set;
- determining that the claim data satisfies the candidate function by determining, without executing the language processing query, that one or more text strings in at least one of the first string set and the second string set are present within the claim data in a pattern corresponding to the at least one logical operator; and
- assigning the insurance claim to the particular destination, based on determining that the claim data satisfies the candidate function.

14. The one or more non-transitory computer-readable media of claim 13, wherein the identifying, the determining, and the assigning are performed in near real-time.

15. The one or more non-transitory computer-readable media of claim 13, wherein the operations further comprise:
- obtaining second claim data associated with a second insurance claim;
- determining that the second claim data does not satisfy the candidate function; and
- providing the second claim data to the batch claim identifier that is configured to perform the language processing query, associated with the particular destination, on the second claim data to determine whether to assign the second insurance claim to the particular destination or to a second destination.

16. The one or more non-transitory computer-readable media of claim 13, wherein:
- the particular destination is a comparative negligence group of workers, associated with an insurance company, that handles insurance claims that involve comparative negligence issues, and
- the candidate function is configured to determine whether the insurance claim is likely to involve the comparative negligence issues and is to be assigned to the comparative negligence group.

17. The one or more non-transitory computer-readable media of claim 15, wherein:
- performance of the language processing query, by the batch claim identifier, and on the second claim data, identifies a new text string within the second claim data that satisfies one of the first subquery or the second subquery, and
- the operations further comprise adding the new text string to the first string set that corresponds to the first subquery or to the second string set that corresponds to the second subquery.

* * * * *